United States Patent [19]
Aron et al.

[11] Patent Number: 5,387,767
[45] Date of Patent: Feb. 7, 1995

[54] TRANSMITTER FOR SONIC LOGGING-WHILE-DRILLING

[75] Inventors: Jeffery B. Aron, Houston, Tex.; Peter J. Airey, St. Germain Laval, France

[73] Assignee: Schlumberger Technology Corporation, Houston, Tex.

[21] Appl. No.: 173,323

[22] Filed: Dec. 23, 1993

[51] Int. Cl.⁶ .............................................. G01V 1/40
[52] U.S. Cl. ...................... 367/25; 367/911; 367/912; 181/102
[58] Field of Search ................ 367/25, 911, 912, 83, 367/154, 155, 157; 181/102, 104, 105, 106; 166/250; 310/311, 322

[56] References Cited

U.S. PATENT DOCUMENTS

| | | | |
|---|---|---|---|
| 3,283,562 | 11/1966 | Heisig et al. | 73/19.1 |
| 3,504,757 | 4/1970 | Chapman, III | 367/25 |
| 4,636,999 | 1/1987 | Lygas | 367/156 |
| 5,043,952 | 8/1991 | Hoyle et al. | 367/159 |
| 5,115,880 | 5/1992 | Sallas et al. | 181/106 |
| 5,166,908 | 11/1992 | Montgomery | 367/165 |
| 5,222,049 | 6/1993 | Drumheller | 367/82 |

Primary Examiner—Ian J. Lobo
Attorney, Agent, or Firm—David L. Moseley; Wayne I. Kanak

[57] ABSTRACT

A sonic transmitter assembly for use in logging-while-drilling includes stacks of piezoelectric crystals that extend outwardly from a nodal plate member, and a generally tubular assembly that contains such stacks and has end portions that are sealingly mounted in diametrically opposed holes in a pipe member that forms a pan of the drill string. Spring mass isolator systems are employed to inhibit transmission of acoustic waves to the pipe member. Balanced mounting forces and the bilateral symmetry of the construction also inhibit transmission of acoustic waves to the pipe member, particularly waves which are asymmetric with respect to the longitudinal axis of the pipe member.

20 Claims, 2 Drawing Sheets

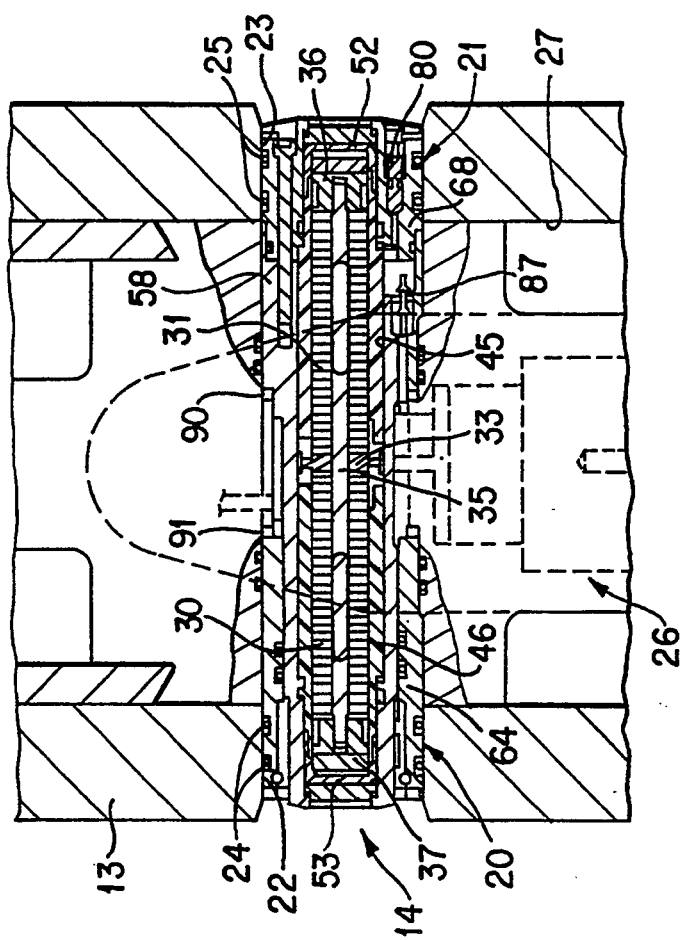
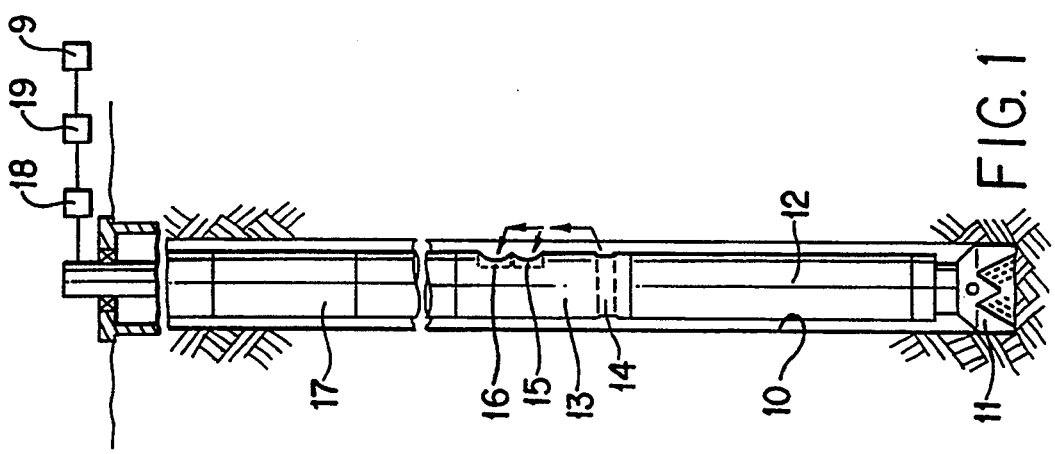

TRANSMITTER FOR SONIC LOGGING-WHILE-DRILLING

BACKGROUND OF THE INVENTION

1. Field of the Invention

This invention relates generally to a sonic energy transmitter for use in logging-while-drilling (LWD), and particularly to a sonic energy transmitter that is constructed and mounted on a drill collar in a manner such that coupling of energy into the drill collar is substantially suppressed.

2. Description of the Related Art

Sonic logging-while-drilling is highly useful in obtaining information concerning the properties of an earth formation that has been penetrated by a drill bit. Sonic LWD permits the travel time of a compressional wave in the formation to be determined. This travel time is important and useful for seismic interpretation and processing because the travel time of a compressional wave in fluid saturated rock is strongly influenced by the porosity of the rock and the type of fluid it contains. Good porosity is necessary for the formation to contain oil or gas in commercial quantities.

In the typical wireline sonic logging technique a transmitter produces acoustic waves which travel through the rocks around the borehole toward several spaced receivers which detect the arrival of the waves in a manner such that the travel time of compressional waves in the rocks can be determined. Sonic LWD measurements are highly desirable compared to wireline measurements because they are made before borehole conditions deteriorate due to alteration of the formation by the drilling mud, loss of the hole under difficult formation conditions, and roughening of the borehole wall due to repeated bit trips. Sonic LWD also eliminates the delays associated with wireline logging, during which drilling operations must be suspended.

A sonic energy transmitter useful in LWD should meet a number of requirements. It must be rugged enough to withstand the drilling environment which includes vibration and shock loads and must output pressure waves strongly and efficiently to the surrounding formation. However, the transmitter should not excite vibrations that could travel along the drill collar itself and cause interference with vibrations returning through the rocks, since these so called collar arrivals seriously degrade the measurement. Therefore, the transmitter should be mounted in a manner that reduces to a minimum the coupling of vibration energy to the collar.

Collar arrivals can also be attenuated by a section of periodic grooves between the transmitter and the receivers. This means of attenuation is most effective for symmetric vibrations, and asymmetric (flexural) vibrations coupled by the transmitter to the collar should therefore be minimized.

An object of the present invention is to provide a new and improved sonic energy transmitter for LWD applications which incorporates the desirable features noted above.

Another object of the present invention is to provide a sonic transmitter of the type described which is constructed, arranged and mounted in a manner such that coupling of energy into the drill collar is minimized.

Still another object of the present invention is to provide a transmitter of the type described which is arranged to decrease the amount of asymmetric energy generated.

SUMMARY OF THE INVENTION

These and other objects are attained in accordance with the concepts or the present invention through the provision of a sonic transmitter assembly which is mounted in diametrically opposed holes through the walls of a collar which forms a section of the drill string near the bit. The assembly includes oppositely extending stacks of washer-shaped piezoelectric crystals which expand and contract about a nodal plate in the center in response to positive and negative electrical stimulations. The stack is located within a generally tubular container assembly having opposite end portions which are received in the openings in the walls of the drill collar. The ends of the container assembly are closed by compliant caps which transmit the motions of the opposite ends of the stack to the fluids in the well annulus where they are coupled into the formation.

In order to minimize the amount of energy coupled into the drill collar, a pair of spring-mass isolator systems are used. One set of springs is used to mount the nodal plate with respect to an outer housing, and another set of springs is used to mount the container assembly on the collar. Moreover, the transmitter assembly is constructed with bilateral symmetry with respect to the nodal plate to reduce, if not eliminate altogether, the coupling of any asymmetrical vibrations to the collar. The end portions of the container assembly are sealed with respect to the holes in the collar walls such that pressure forces on the assembly are balanced. Thus, with increasing depth or pressure in the borehole, the vibration path and coupling to the collar remain constant.

BRIEF DESCRIPTION OF THE DRAWINGS

The present invention has the above as well as other objects, features and advantages which will become more clearly apparent in connection with the following detailed description of a preferred embodiment, taken in conjunction with the appended drawings in which:

FIG. 1 is a schematic view of a logging-while-drilling operation;

FIG. 2 is a longitudinal sectional view showing a sonic energy transmitter in accordance with the present invention mounted on a drill collar;

DETAILED DESCRIPTION OF A PREFERRED EMBODIMENT

Figure 3:
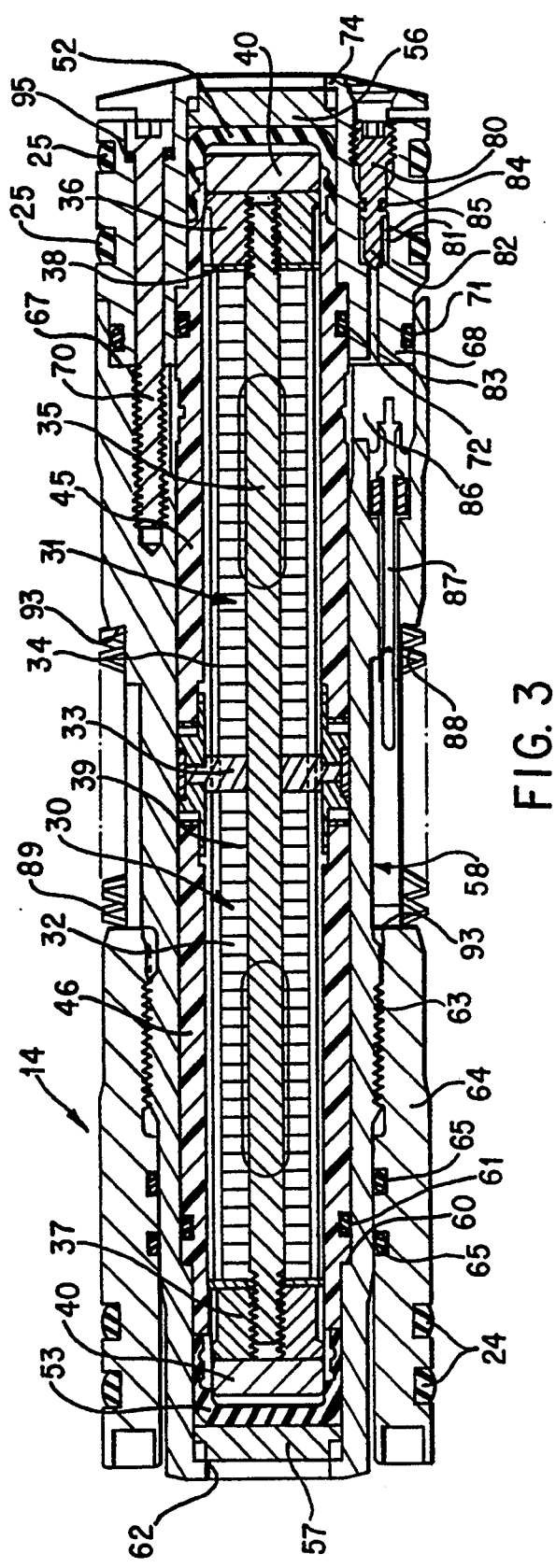
FIG. 3 is a further enlarged cross-sectional view showing the structural details of the transmitter of FIG. 2.

Referring initially to FIG. 1, a borehole 10 is shown being drilled into the earth by a rotary drill bit 11 on the lower end of a drill string 12. The drill string 12 includes a sonic collar 13 having a sonic energy transmitter 14 mounted thereon, as well as several axially spaced receivers 15, 16. Another drill collar 17 usually located above the collar 13 houses a data transmission system of the type shown, for example, in U.S. Pat. Nos. 4,100,528; 4,103,281; 4,167,000 and 5,237,540; which are incorporated herein by reference, wherein encoded pressure pulses produced by a rotary valve travel up to the surface through the mud inside the drill string 12. Some of these pulses represent the measurements made by the sonic collar 13. The pressure pulses are detected at the surface by detector 18, decoded at decoder 19 and then displayed and recorded at display unit 9. Thus the compressional travel time measurements made by the sonic collar 13 are available at the surface substantially in real time.

As shown in FIG. 2, the opposite end portions 20, 21 of the transmitter 14 are received in diametrically opposed openings or holes 22, 23 that extend through the walls of the collar 13. Seal rings 24, 25 on the portions 20, 21 engage the walls of the openings 22, 23 to prevent fluid leakage from inside collar 13 to the annulus within borehole 10. The diameters of the openings 22, 23 are identical so that there are no unbalanced lateral forces on the transmitter 14 due to pressure differences inside and outside the collar 13 during drilling. The transmitter 14 is mounted inside a spider or flow diverter assembly 26 that is fixed within the bore 27 of the collar 13, diverter assembly 26 providing flow passages and ports for electrical wiring and connector components which need not be described since they form no part of the present invention. The diverter 26 also forms a pair of oppositely facing, annular shoulders 90 and 91 which cooperate in the mounting of the transmitter 14 as will be described in detail below.

As shown in further detail in FIG. 3, the transmitter assembly 14 includes oppositely extending stacks 30, 31 having equal numbers of washer-shaped piezoelectric crystals 32 and a nodal plate 33 between the inner ends of such stacks. Each piezoelectric crystal 32 is silver-coated on its two faces and has a built-in electrical polarization. Because of this, one face is denoted positive (+) while the other is denoted negative (−), and a positive voltage from the negative (−) to the positive (+) face causes the crystal thickness to increase. This is the piezoelectric effect.

Figure 4:
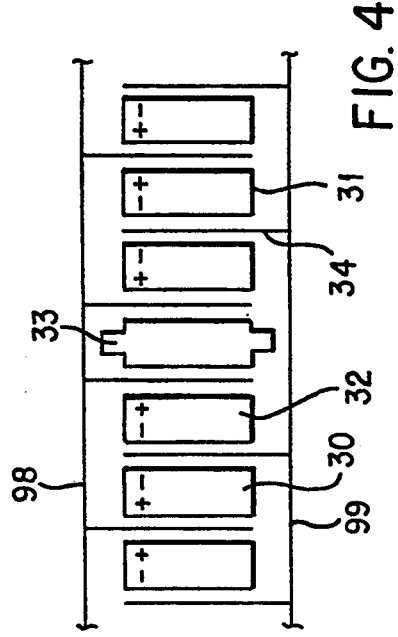
FIG. 4 is a partial schematic view of the piezoelectric crystal stack of the transmitter illustrating the polarity of the crystals.

The placement of the piezoelectric crystals 32 in each stack 30, 31 with respect to their polarizations is shown in FIG. 4. In each stack 30, 31, the innermost crystal faces abutting the nodal plate 33 are positive. Proceeding away from the center, the next crystal 32 has a negative face facing inward and abutting the negative face of the innermost crystal 32. Thus the crystals 32 are arranged in each stack 30, 31, so that the faces of adjacent crystals have the same polarity. Thin metal electrodes 34 are mounted between adjacent faces of the crystals 32.

Figure 5:
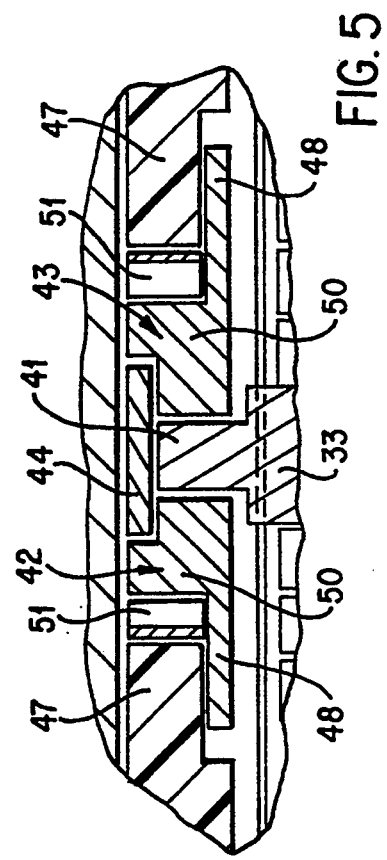
FIG. 5 is a fragmentary cross-section view of certain details of the transmitter.

Referring again to FIG. 3, the stacks 30, 31 are held together under compression by a central rod 35 whose opposite ends are threaded to nuts 36, 37. An insulator 38 is positioned between each nut and the outermost electrode 34. Additionally, a thin cylindrical insulator 39 is fitted over the central rod 35 inside stacks 30, 31. As shown in better detail in FIG. 5, the nodal plate 33 has an outwardly directed flange 41, and insulating sleeves 42, 43 are positioned on opposite sides of the flange 41. An insulating ring or band 44 surrounds the flange 41 and a portion of each sleeve 42, 43 and, with the aforementioned insulators, serves to protect against short circuits and arcing.

All the electrodes 34 between the positive faces of the crystals 32 are connected together by a single bus bar 98 forming a positive terminal as shown schematically in FIG. 4. Similarly, all the electrodes 34 between the negative faces of the crystals 32 are connected together by another single bus bar 99 forming a negative terminal. This arrangement allows the piezoelectric effect of the crystals 32 to be coordinated for maximum motion. When the terminals are connected to an alternating voltage generator (not shown), the stacks 30, 31 expand and contract in unison generating pressure waves in the surrounding medium. It should be noted that the motion of the combined stacks 30, 31 is similar to the lowest order of a half wave resonator that is free at the ends. This motion has a maximum amplitude at the ends (nuts 36, 37), has a null at the center (nodal plate 33), and is symmetric about the center.

The above-described crystal assembly is mounted within a pair of carrier sleeves 45, 46 which preferably are made of relatively soft plastic material. The inner portion 47 (FIG. 5) of each carrier sleeve 45, 46 has an enlarged inner diameter so that it slips over the skirt 48 of insulating sleeve 42, 43, and the end face of each carrier sleeve 45, 46 terminates short of the enlarged diameter portion 50 of each insulating sleeve 42, 43. A spring such as an undulating or wavy washer 51 is fitted in each of the gaps between the portions 50 and the end faces of the insulating sleeves 42, 43. Diametrically opposed slots (not shown) are formed in the nodal plate 33 for the passage of bus bars 98, 99 by which voltages are applied to the crystal electrodes 34. The outer ends of the carrier sleeves 45, 46 are closed by compliant caps 52, 53 which can be made of rubber or a rubber-like substance. Barrier discs 56, 57 are loosely mounted at the outer ends of the carrier sleeves 45, 46. Floating discs 40 are positioned inside caps 52, 53 adjacent nuts 36, 37.

The components thus far described are mounted or contained within a tubular housing, indicated generally at 58, which is filled with oil. The housing 58 has an internal shoulder 60 that engages an external shoulder on the carrier sleeve 46. A seal ring 61 prevents leakage of the oil surrounding stacks 30, 31. An inwardly extending flange 62 on the outer end of the housing 58 retains the barrier disc 57 in place. The housing 58 has external threads 63 that mesh with companion threads on a mounting sleeve 64, and internal seal rings 65 are provided to prevent infiltration of the drilling mud into the electrical connections of transmitter 14. The external seal rings 24 on mounting sleeve 64 engage inner wall surfaces of the opening 22 in the drill collar 13 when the transmitter 14 is in place as shown in FIG. 2.

The other end of the housing 58 is provided with an annular seat 67 that receives the reduced diameter inner end portion of a head 68. The head 68 is held in the seat 67 by several cap screws 70 which extend into threaded bores in the housing 58. Each cap screw 70 has a seal ring 95 to prevent oil leakage from transmitter 14. A seal ring 71 prevents oil leakage between the head 68 and the seat 67, and another seal ring 72 prevents oil leakage between the head 68 and the carrier sleeve 45. External seal rings 25 engage the walls of the opening 23 in the drill collar 13. The head 68 has an inwardly extending flange 74 to retain the barrier disc 56.

An oil filling valve element 80 is threaded into a bore 81 in the head 68 and has an end portion 82 which seats against a surface which surrounds the outer end of a passageway 83 which opens into the interior of the transmitter assembly 14. The valve element 80 also carries a seal ring 84. A transverse port 85 extends from the valve seating area to the outside of the head 68. When the valve 80 is moved outwardly by turning the same, procedures are used to evacuate the interior spaces of the transmitter assembly 14 and then to fill such spaces with a non-conductive oil. The oil in the interior of transmitter 14 efficiently couples the motion of the nuts 36, 37 to the exterior of the caps 52, 53 and through barrier discs 56, 57 to set up pressure waves in the borehole 10. Note that in this coupling the caps 52, 53, the floating discs 40, and the barrier discs 56, 57 have very little acoustic attenuation or effect. The compliant caps, 52, 53, via their expansion and contraction, also compensate for changes in the oil volume with temperature and pressure.

A cavity 86 is formed in the outer end of the head 68 into which electrical feed-through assemblies 87 extend so that conductor wires (not shown) can couple the bus bars 98, 99 to the external voltage generator (not shown) by which the crystals 32 are excited. Resilient elements, preferably bellville washer sets 88 and 89, are positioned between the shoulders 93 which are formed on the inner end faces of the mounting sleeve 64 and the housing 58, and the shoulders 90 and 91 (FIG. 2) on the flow diverter 26. As will appear below, the wavy washers 51, the carrier sleeves 45, 46 and the bellville washers 88, 89 constitute parts of spring-mass systems which attenuate transmission of sonic waves to the drill collar 13.

OPERATION

In operation, the transmitter assembly 14 is assembled as shown in the drawings, except for the mounting sleeve 64 and the left side bellville washers 89, and then loaded into the collar 13 through the hole 23. Then the left side washers 89 and the mounting sleeve 64 are installed through the opposite hole 22 and the threads 63 are made up. The various electrical connections also are made up by means of a connector block that engages feed-through assemblies 87. It should be noted that the entire transmitter system has bilateral symmetry about the longitudinal axis of the collar 13, which is an additional feature of the present invention. The sonic collar 13 is connected into the drill string 12 which then is lowered into the borehole 10. As the borehole 10 is deepened by the bit 11, a sonic log is obtained by pulsing a voltage generator connected to transmitter 14 and detecting the arrival of sonic waves that have traveled upward through the formation into the spaced receivers 15 and 16 as shown in FIG. 1. The use of spaced receivers is preferred to eliminate travel time in the mud and the effect of borehole diameter on the measurements. As noted above, more porous formations have a lower sound velocity.

When a positive voltage is applied across the terminals to the crystal stacks 30, 31 they both expand about the nodal plate 33, causing pressure waves to radiate outward at each end. When a negative voltage is applied, the stacks 30, 31 contract about the nodal plate 33 in preparation for the next expansion. Since the composite stack of crystals is held at its center on the nodal plate 33 where motion is at a minimum, motion imparted to the container assembly from the stack is minimized. Such nodal plate support thus is an important feature of the present invention.

The nodal plate 33 is held in the housing 58 by wavy washers 51 and by the long, thin high temperature plastic carrier sleeves 45, 46. The wavy washers 51, together with the mass of the stacks 30, 31 and the carrier sleeves 45, 46 form a spring-mass isolator system in which the stack and sleeve masses resonate with the springs. However, the wavy washers 51 are compliant enough so that the isolator resonance is much lower than the operating frequency of the transmitter 14, and there is significant attenuation at such operating frequency. Thus if there is some residual motion of the nodal plate 33 at the operating frequency, it will be attenuated as it is transferred to the housing 58.

The springs 88, which as noted above are bellville washers, hold the housing 58 assembly in the collar 13. The threaded mounting sleeve 64 allows the housing 58 to be inserted into the collar 13 while being held with equal force on both ends. Thus, any residual vibration coupled into collar 13 will be symmetric and equal at shoulders 90, 91. The housing 58 also is isolated from the collar 13 by the springs 88. Again, the design is such that the resonance or natural frequency of the springs 88 plus the transmitter assembly 14 is much lower than the operating frequency of the transmitter, so that residual motion transmitted from the housing 58 to the flow diverter 26 and the collar 13 is attenuated. Indeed, the springs 88 are a primary means to prevent the sonic energy from coupling into the collar 13.

The transverse cross-sectional areas bounded by the seal rings 24, 25 on the mounting sleeve 64 and the head 68 are equal, so that pressure forces on the transmitter 14 are always balanced. Thus the only force holding the transmitter 14 in the collar 13 is due to the springs 88. This means that the spring isolator formed by springs 88 is maintained, regardless of well depth, and is independent thereof. The mounting forces are constant with depth, and are symmetric so as to minimize the generation of asymmetric vibrations. Thus any collar arrivals should be independent of depth.

The sonic transmitter 14 of the present invention also has bilateral symmetry in that the stacks 30, 31, the carrier sleeves 45, 46, the components of the housing 58, and the collar around it are symmetric about the nodal plate 33. The retention point for the nodal plate 33 is constrained by the geometry of the carrier sleeves 45, 46, the housing assembly 58, the wavy washers 51 and the bellville washers 88 so that the stacks 30, 31 are centered transversely in the collar 13. This arrangement makes the acoustic loading and coupling of any motion as symmetric as possible. Thus any residual motion imparted from the stacks 30, 31 to the housing 58 and to the collar 13 will be primarily symmetric. This minimizes the generation of asymmetric collar arrivals.

It will be recognized that a new and improved sonic transmitter for use in LWD has been disclosed. The coupling of motion into the drill collar is minimized, particularly asymmetric motion. Thus the detection of arrivals of sonic waves that have traveled through the formation is enhanced. Since certain changes or modifications may be made in the disclosed embodiment without departing from the inventive concepts involved, it is the aim of the appended claims to cover all such changes and modifications falling within the true spirit and scope of the present invention.

What is claimed is:

1. Acoustic transmitter means adapted to be mounted on a pipe member in a borehole, comprising: oppositely arranged piezoelectric crystals having a nodal plate therebetween, said crystals generating sonic wave energy when subject to electrical excitation; generally tubular container means surrounding said crystals and said plate; first resilient means for mounting said crystals in said container means to inhibit the transmission of said wave energy to the pipe member; and second resilient means for mounting said container means on the pipe member to provide additional inhibition of transmission of said wave energy to the pipe member.

2. The transmitter means of claim 1 wherein said pipe member has diametrically opposed holes through the walls thereof, said container means having opposite end portions positioned in said holes.

3. The transmitter means of claim 2 further including seal means on said end portions arranged to engage wall surfaces of said holes, the areas of engagement of said seal means with said wall surfaces being such that said container means experiences balanced pressure forces in a well bore.

4. The transmitter means of claim 3 further including means for filling all internal spaces in said transmitter means with fluid to transmit balanced pressure forces through said transmitter means.

5. The transmitter means of claim 2, wherein said opposite end portions have opposed shoulder surfaces; mounting shoulder surfaces on said pipe member arranged between said opposed shoulder surfaces and laterally spaced therefrom, said second resilient means being spring washers fitted between said shoulder surfaces.

6. The transmitter means of claim 2, wherein said container means includes internal sleeve means having spaced-apart inner end surfaces, guide sleeves adjacent said end surfaces and providing a gap therebetween, said nodal plate having an external flange that projects between said guide sleeves, said first resilient means being spring means which engage in said gaps between said end surfaces and said guide sleeves on opposite sides of said flange.

7. The transmitter means of claim 1 further including means mounted in the opposite ends of said container means for transmitting sonic wave energy generated by said crystals to the adjacent medium in the borehole.

8. Acoustic transmitter means adapted to be mounted on a pipe member in a borehole, comprising: oppositely arranged stacks of piezoelectric crystal washers having a nodal plate therebetween, inner sleeve means including a first sleeve member surrounding one of said stacks and a second sleeve member surrounding the other of said stacks, said nodal plate having an outward directed flange located between the inner ends of said sleeve members and spaced therefrom; first resilient means arranged between each of said inner ends and said flange; outer sleeve means including a tubular member having a seat at one end, said tubular member having a first shoulder; a first head fitted in said seat and secured to said tubular member; a second head releasably attached to said tubular member and having a second shoulder spaced from said first shoulder, said shoulders being adapted to be engaged by second resilient means by which said transmitter means is mounted on the pipe member.

9. The transmitter means of claim 8 further including valve and passage means in said first head for filling internal spaces of said transmitter means with fluid.

10. The transmitter means of claim 8 wherein said heads are arranged to be mounted in diametrically opposed holes through the walls of the pipe member, said first and second heads carry external seal means having the same area of sealing engagement with wall surfaces of said holes.

11. The transmitter means of claim 8 wherein said crystal washers are separated by electrodes, and further comprising means including tabs on said electrodes and bus bars extending along said stacks for electrically connecting alternating ones of said electrodes to a voltage source.

12. The transmitter means of claim 8 wherein said first and second sleeve members are made of an elastic plastic material.

13. The transmitter means of claim 8 constructed and arranged to have bilateral symmetry about said nodal plate to make the acoustic loading and coupling of any motion substantially symmetrical to thereby reduce any asymmetric motions imparted from the stacks and sleeve members to the pipe member to a minimum.

14. A logging-while-drilling tool for use in transmitting sonic energy into a formation to permit measurement of the porosity of the formation, comprising: a tubular member having diametrically opposed holes through the walls thereof; flow diverter means in said tubular member providing oppositely facing first annular shoulders whose transverse axis is concentric with the transverse axis of said holes; a sonic energy transmitter assembly including generally tubular container means having end portions mounted in said holes, oppositely extending stacks of piezoelectric crystals in said container means, and a nodal plate member positioned between adjacent ends of said stacks, said end portions each defining second annular shoulders which are arranged in space opposite to said first annular shoulders to provide annular gaps therebetween; and resilient means positioned in said annular gaps between said shoulders to provide a system which inhibits the transmission of acoustic energy from said transmitter assembly to said tubular member.

15. The tool of claim 14 wherein said stacks of crystals are encased in oppositely extending sleeve members; ring members mounted on opposite sides of said nodal plate member and providing first and second annular recesses adjacent the inner ends of said sleeve members; and additional resilient means mounted in said annular recess means to provide a first spring-mass isolator system.

16. The tool of claim 15 wherein said sleeve members are made of a plastic material having a resilient characteristic to provide a portion of said first spring-mass isolator system.

17. The tool of claim 15 wherein said nodal plate member has a center which is aligned with the longitudinal axis of said tubular member.

18. The tool of claim 14 further including valve and passage means for filling all interior spaces of said transmitter assembly with a non-conductive oil.

19. The tool of claim 14, wherein said holes have equal cross-sectional areas, and wherein said end portions carry seal means engageable with the wall surfaces of said holes so that pressure differentials act with equal force in opposite transverse directions on said transmitter assembly.

20. The tool of claim 14, wherein said transmitter assembly is constructed and arranged to provide bilateral symmetry about said nodal plate member.

* * * * *